Aug. 10, 1926.
W. KRAUSE
IRRIGATION SYSTEM
Original Filed May 20, 1920
1,595,201
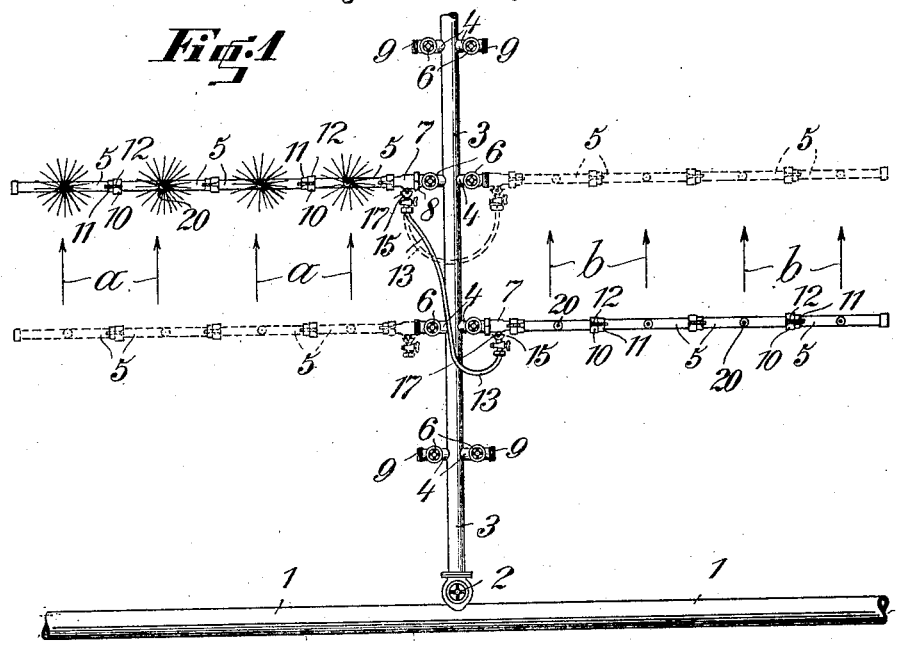
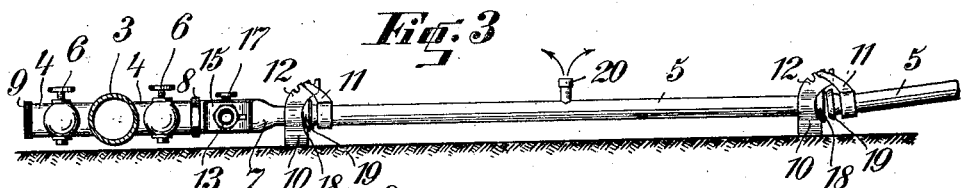
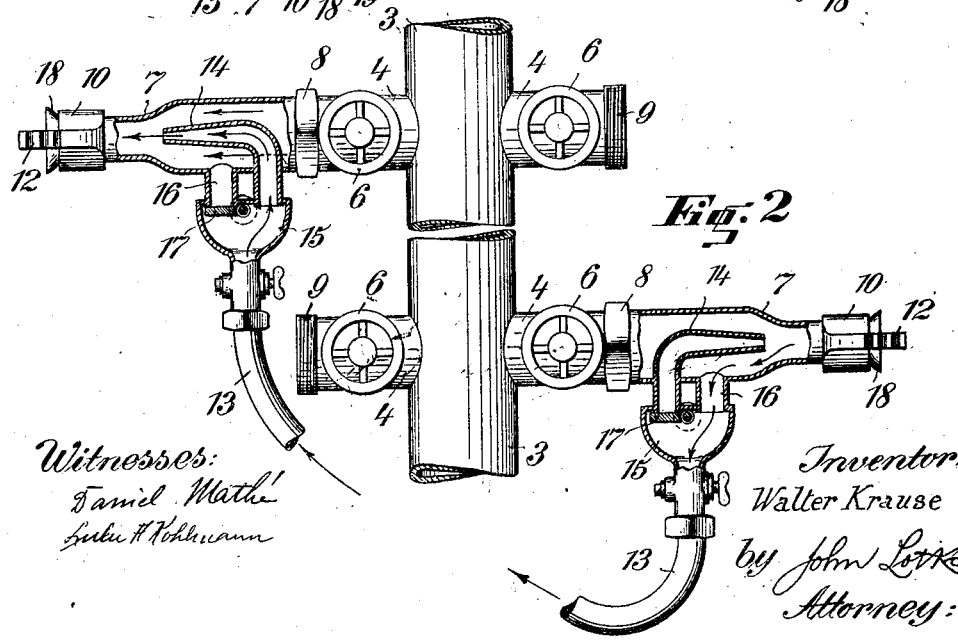
Witnesses:
Daniel Mathé
Lulu H. Kohlmann
Inventor:
Walter Krause
by John Lotka
Attorney Patented Aug. 10, 1926.

1,595,201

UNITED STATES PATENT OFFICE.

WALTER KRAUSE, OF FRIESACK, GERMANY.

IRRIGATION SYSTEM.

Application filed May 20, 1920, Serial No. 383,018, and in Austria January 29, 1919. Renewed January 27, 1926.

My invention relates to improvements in irrigation systems, and more particularly in systems of that class in which the water is sprinkled so as to fall on the field from above in the form of a shower or spray acting like rain. The object of the improvements is to provide a system of this class which is simple and effective in operation. With this object in view my invention consists in providing a field conduit through which the water is supplied under pressure, and nozzle conduits which are branched off from the field conduit preferably at opposite sides and are adapted to be alternately thrown into operation and to be successively connected to the field conduit at different points thereof, said nozzle conduits being made in sections which can readily be jointed or disconnected from one another. A further object of the improvements is to provide a system in which the water left in one nozzle conduit after irrigating one part of the field can be transferred to another nozzle conduit before throwing the latter into operation.

In order that my invention be more clearly understood an example embodying the same has been shown in the accompanying drawing, in which the same letters of reference have been used in all the views to indicate corresponding parts. In said drawing:—

Fig. 1 is a plan view of my improved system,

Fig. 2 is a plan view partly in section and showing on a larger scale the means for withdrawing the water from the nozzle conduits, and Fig. 3 is a side view of one of the nozzle pipes and its joint to the main conduit.

In the example shown in the figures my improved system consists of a main pipe 1, one or more field pipes 3 connected with the main pipe through a valve 2 or the like and provided at suitable distances and at opposite sides with short branch tubes 4, 4 provided with valves 6, and nozzle conduits 5, 5 adapted to be connected to the tubes 4. In the example shown in the figures the conduits 5, 5 are connected to the tubes 4 through the intermediary tubular members 7 which are connected to the tubes 4 by means of cap nuts 8 screwed to the screw-threaded ends 9 of the tubes 4, as is shown in Fig. 2. The construction of the tubular members 7 will be described more in detail hereafter. The conduits 5, 5 are made in sections each of which is provided with a nozzle 20, and which are connected with one another by means of joints which permit of a rapid application and removal of the sections, the latter being supported at a suitable distance above the ground by means of shoes 10. In the example shown in the figures the joints are constructed as follows: The ends of the sectional pipes 5 are provided with flanges 18 and 19 having corresponding spherical contacting faces, and one of the pipe ends carries a notched arm 12 and the adjacent pipe end a bail 11 engaging in one of the notches of the arm 12. As the arm 12 and bail 11 are disposed above the pipe sections, the contacting faces of the flanges 18 and 19 are forced by gravity into tight contact with each other. In the same way the joint is made between the tubular member 7 and the adjacent section 5.

As appears from Fig. 1 my improved system is provided at least with two conduits 5, 5, and the said conduits are adapted to be connected with each other by a tube 13 cooperating with a suitable suction apparatus for withdrawing the water from one conduit 5, 5 at the end of an operation thereof, and supplying the said water to the other conduit 5, 5 when starting the operation thereof. Therefore the water left within a conduit is not spilt on one part of the soil when disconnecting the conduit, which would be objectionable by reason of the large mass of water supplied to one part of the field. As shown the said suction apparatus consists of a nozzle 14 disposed centrally within the tubular member 7 and connected with a chamber 15 connected with the tubular member 7 through a short tube 16. Within the chamber 15 a valve 17 is located by means of which either the nozzle 14 or the tube 16 can be closed as against the chamber 15. In the position of the parts shown in Figs. 1 and 2 the chamber 15 located at the right of the conduit 3 is in communication through the tube 16 with the tubular member 7, while it is closed as against the nozzle 14, and the chamber 15 located at the left of the conduit 3 is in communication with the nozzle 14, while the tube 16 is closed by the valve 17. The valve 6 of the right hand conduit 5, 5, which has just finished irrigation, is closed, and irrigation is started in the left hand conduit by opening the valve 6 thereof and supplying water under pressure thereto. The current of water which flows along the nozzle 14 produces a vacuum within said nozzle, by which the water is drawn from the right hand conduit 5, 5 and supplied to the left hand conduit. When all the water has been withdrawn from the right hand conduit, this conduit can be disconnected from its tube 4 and connected to the next tube 4 after advancing the conduit in the direction of the arrows $b$ shown in Fig. 1. When irrigation by the left hand conduit is completed the valve 6 thereof is closed, the tube 13 is in the position shown in Fig. 1 in dotted lines, the positions of the valves 17 in the right and left chambers 13 are reversed, and the right hand valve 6 is opened, whereupon irrigation by the right hand conduit 5, 5 is started, and the water from the left hand conduit 5, 5 is withdrawn by suction. Thereupon the left hand conduit 5, 5 is disconnected, shifted in the direction of the arrows $a$, and connected with the next tube 4. The dotted lines at the left of Fig. 1 indicate an earlier position of said left-hand conduit.

Preferably the cross-sectional area of the pipes 5, 5 is gradually reduced from the conduit 3 to the outer sections. The length of each section is such that one section, its supports, and joints, can easily be carried by one man. The distance between adjacent spraying nozzles of each conduit, and the distance between successive conduits is about 18 feet, because experience has shown that practically a sprinkling nozzle can distribute the water over a surface of about 360 square feet. As one of the conduits 5, 5 is transferred from one position to the next one while the other conduit is in operation, the irrigation takes place without interruption.

While in describing the invention reference has been made to an embodiment thereof which in my opinion serves its purpose best, I wish it to be understood, that my invention is not limited to the example shown in the figures, and that various changes may be made in the general arrangement of the system and in the construction of its parts.

I claim:—

1. In an irrigation system, the combination with a water supply conduit provided with a plurality of normally closed joints located at each side of said supply conduit, two branch conduits each adapted for connection with any one of said joints and normally extending in opposite directions from said supply conduit, each of said branch conduits consisting of a plurality of readily shiftable rigid nozzle sections arranged in tandem fashion, one end of each rigid nozzle section being in direct engagement with the adjacent end of a neighboring nozzle section of like rigid character, and quickly-detachable couplings the elements of which are located at the ends of said rigid nozzle sections and form unitary structures with said nozzle sections, whereby each branch conduit will form a substantially rigid structure and whereby, in alternation, either of said branch conduits may be shifted lengthwise of the said supply conduit, section by section, to the next joint of said supply conduit, while the other branch conduit is operating on the opposite side of said supply conduit.

2. In an irrigation system, the combination, with a conduit having a supply of water under pressure and a plurality of normally closed joints for branch conduits, of branch conduits adapted to be connected to said joints and to be alternately thrown in communication with said water supply conduit, and means to withdraw water from one branch conduit and deliver it to the other one.

3. In an irrigation system, the combination, with a conduit having a supply of water under pressure and a plurality of normally closed joints for branch conduits, of branch conduits adapted to be connected to said joints and to be alternately thrown in communication with said water supply conduit, and suction apparatus adapted to withdraw water from one branch conduit and deliver it to the other one.

4. In an irrigation system, the combination, with a conduit having a supply of water under pressure and a plurality of normally closed joints for branch conduits, of branch conduits adapted to be connected to said joints and to be alternately thrown in communication with said water supply conduit, and suction apparatus connecting two branch conduits and operated by the current of water supplied to one of said branch conduits to withdraw water from the other branch conduit.

In testimony whereof I hereunto affix my signature.

WALTER KRAUSE.